(12) United States Patent
Komma

(10) Patent No.: US 9,401,651 B2
(45) Date of Patent: Jul. 26, 2016

(54) TRANSFORMER SUB-CIRCUIT

(75) Inventor: Thomas Komma, Ottobrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 367 days.

(21) Appl. No.: 14/235,209

(22) PCT Filed: Jul. 23, 2012

(86) PCT No.: PCT/EP2012/064397
§ 371 (c)(1),
(2), (4) Date: Jan. 27, 2014

(87) PCT Pub. No.: WO2013/014124
PCT Pub. Date: Jan. 31, 2013

(65) Prior Publication Data
US 2014/0204618 A1 Jul. 24, 2014

(30) Foreign Application Priority Data
Jul. 27, 2011 (DE) .......... 10 2011 079 918

(51) Int. Cl.
*H02M 3/335* (2006.01)
*B60L 11/18* (2006.01)

(52) U.S. Cl.
CPC ......... *H02M 3/33523* (2013.01); *B60L 11/182* (2013.01); *B60L 11/1812* (2013.01); *B60L 11/1833* (2013.01); *B60L 2210/30* (2013.01); *B60L 2210/40* (2013.01); *Y02T 10/7005* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
CPC .............. B60L 11/182; B60L 11/1833; B60L 11/1812; B60L 2210/30; B60L 2210/40; H02M 3/33523; H02M 3/3353
See application file for complete search history.

(56) References Cited

U.S. PATENT DOCUMENTS

| 4,706,177 | A | | 11/1987 | Josephson | |
|---|---|---|---|---|---|
| 5,182,702 | A | * | 1/1993 | Hiramatsu | ............ H02M 1/425 315/247 |
| 6,160,374 | A | * | 12/2000 | Hayes | ..................... H02J 7/025 320/108 |
| 7,796,410 | B2 | | 9/2010 | Takayanagi et al. | |
| 2004/0189251 | A1 | | 9/2004 | Kutkut et al. | |
| 2009/0034300 | A1 | * | 2/2009 | Ito | ....................... H02M 1/4233 363/17 |
| 2012/0032633 | A1 | | 2/2012 | Cordes et al. | |

FOREIGN PATENT DOCUMENTS

| DE | 102006030594 A1 | 1/2008 |
|---|---|---|
| EP | 1919070 A2 | 5/2008 |
| WO | 2010115867 A1 | 10/2010 |

* cited by examiner

Primary Examiner — Jessica Han
(74) Attorney, Agent, or Firm — Laurence Greenberg; Werner Stemer; Ralph Locher

(57) ABSTRACT

A transformer sub-circuit for use in an electrically operated vehicle includes a bridge circuit which has at least four MOSFETs and capacitors connected in parallel with the MOSFETs, and an inductor connected to the bridge circuit for use as a primary side of a transformer. A control device or controller for the inverter is configured to cause switching of the MOSFETs in such a way that operation is performed at a frequency that is higher than the resonance frequency.

7 Claims, 2 Drawing Sheets

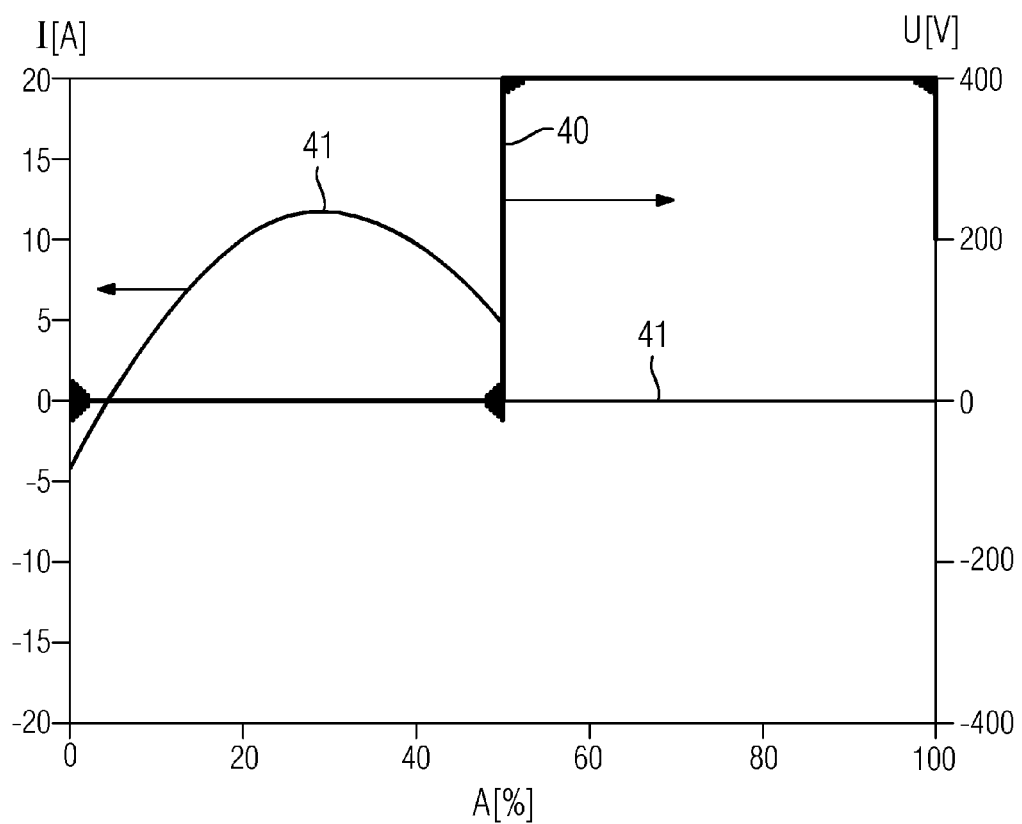

TRANSFORMER SUB-CIRCUIT

BACKGROUND OF THE INVENTION

Field of the Invention

The invention relates to a transformer sub-circuit to be used for charging an electrically operated vehicle.

In order to make increased use of electrically operated vehicles such as automobiles possible it is necessary to provide an infrastructure with opportunities for recharging the vehicle batteries. As well as charging via cable and plug systems there is also the possibility of wireless recharging through inductive coupling. For this purpose special transformers are used, of which the primary and secondary side are spatially separated by larger air gaps ranging from 1 to 30 cm.

In such cases the primary side is viewed as that side of the transformer which is arranged below the motor vehicle, in the floor for example. The secondary side is part of the motor vehicle and is arranged in the area of the vehicle floor. Depending on the available free floor space of the motor vehicle and the parking position, i.e. the relative arrangement of primary and secondary side, different values are produced for the transformer stray inductances and for the main inductance. Compared to conventional transformers, of which the parts are not separable, very high values are produced for the stray inductances and comparatively small values for the main inductance.

The inverters for the primary side are typically constructed with IGBTs and operated exactly in the resonance frequency. This makes it possible to switch off the individual semiconductor switches during the current zero crossing, which leads to the lowest possible switching losses. If the switching time is not precisely in the resonance point then the losses increase significantly.

BRIEF SUMMARY OF THE INVENTION

The object of the present invention is to specify a transformer sub-circuit to be used for charging an electrically operated motor vehicle, said sub-circuit being characterized by a simplified structure and improved characteristics in relation to its switching losses.

This object is achieved by a transformer sub circuit to be used for charging an electrically operated vehicle, including a stationary-side bridge circuit with a least two semiconductor switches, wherein the semiconductor switches are MOSFETs, a stationary-side inductance connected to the bridge circuit, to be used as the primary side of a transformer, and a control device for the semiconductor switches of the bridge circuit, embodied to operate the bridge circuit as an inverter, and in doing so to undertake the switching off of one of the semiconductor switches when the current flow through the semiconductor switch reaches a definable threshold value differing from zero. The dependent claims relate to advantageous embodiments of the transformer sub-circuit.

The inventive transformer sub-circuit is suitable for use during charging of the battery of an electrically operated motor vehicle. For this purpose the transformer sub circuit is fitted for example into the floor area of a parking space intended for charging and acts as the primary side of a transformer which is produced when an electrically operated motor vehicle with a corresponding secondary side is stationary on the parking space. The transformer sub circuit has a bridge circuit with a least two semiconductor switches, especially four semiconductor switches. Connected to the bridge circuit is an inductance for use as the primary side of the transformer produced. Finally the transformer sub circuit comprises a control device for the semiconductor switches of the bridge circuit. The control device is embodied to operate the bridge circuit as an inverter. In such cases in accordance with the invention one of the semiconductor switches is then switched off when the current flow through the semi conductor switch reaches a definable threshold value or passes said value. In accordance with the invention MOSFETs are used as semiconductor switches. Preferably the switching frequency amounts to more than 100 kHz. In other words the control device is embodied to cause a switching of the semiconductor switches such that operation takes place at a frequency increased by comparison with the resonance frequency.

The inventive structure allows operation with extremely low switching losses, since the current to be switched off commutes into the parallel stray capacitances always present in the MOSFETs. At the same time it is also advantageously possible to undertake an adaptation of the operating frequency to compensate for such changes of the electrical characteristics which are produced by the different parking positions of electrically operated motor vehicles above the transformer sub-circuit. Advantageously this means that even if a vehicle is not in its optimum parking position charging can take place with the lowest possible losses.

To achieve overresonant operation, the semiconductor switches actively switch off a current that differs from zero. The current switched off in such cases preferably amounts to between 2 A and 10 A. The precise switching point is determined in a preferred embodiment on the basis of a current measurement.

Expediently after one of the semiconductor switches has been switched off another of the semiconductor switches is switched on after a dead time of 100 ns to 200 ns has elapsed for example. In this time the stray capacitances are recharged. A current flow through the further semiconductor switch occurs in such cases initially through the parallel parasitic body diode only after the next current zero crossing. It is therefore advantageously not necessary to detect the zero crossing precisely for the switch-on.

In accordance with one embodiment the semiconductor switches involve individual MOSFETs. In an alternate embodiment, instead of the four semiconductor switches in the inverter, a parallel circuit of a number of individual MOSFETs is used in each case.

BRIEF DESCRIPTION OF THE SEVERAL VIEWS OF THE DRAWING

A preferred but in no way restrictive exemplary embodiment for the invention will now be explained in greater detail with reference to the figures. The features are represented here in schematic form. In the figures FIG. 2 shows the frequency curve of the stationary charging circuit and FIG. 3 shows a graph of the drain current and drain-source voltage.

DESCRIPTION OF THE INVENTION

Figure 1:
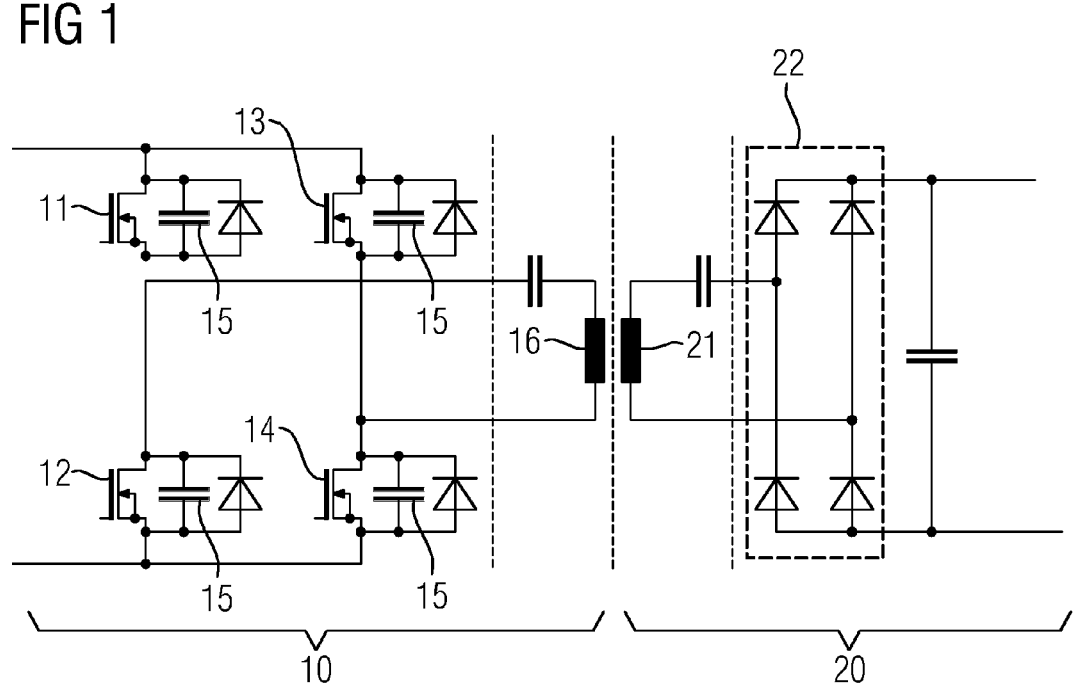
FIG. 1 shows a stationary charging circuit together with a vehicle-side charging circuit.

FIG. 1 shows a stationary charging circuit 10 together with a vehicle-side charging circuit 20. The vehicle-side charging circuit 20 has a vehicle-side coil 21, which acts as a part of a transformer. The vehicle-side coil 21 is connected in this exemplary embodiment to a diode rectifier 22, the outputs of which are connected to the further power electronics of the motor vehicle, which is not shown.

The stationary charging circuit 10 has a stationary-side coil 16 which couples inductively with the vehicle-side coil 21. In the real environment the stationary charging circuit is accommodated for example in the floor in the area of a parking space, wherein the parking space is intended for wireless charging of electrically operated motor vehicles. The vehicle-side coil 21 in its turn, together with the bridge rectifier, is part of an electrically operated motor vehicle. The electrically operated motor vehicle is positioned for charging on the parking space. The relative arrangement of the vehicle-side coil 21 and the stationary-side coil 16 is variable in such cases and is produced by the vehicle position. The variable positioning in its turn causes a marked variability of the electrical characteristics of the transformer produced from the vehicle-side coil 21 and the stationary-side coil 16.

The stationary charging circuit 10, as well as the stationary-side coil 16, also has an inverter connected thereto, consisting of a first to fourth MOSFET 11 . . . 14.

Each of the MOSFETs 11 . . . 14 has a certain stray capacitance, which is represented in each case by a capacitor 15 in a parallel circuit. The MOSFETs 11 . . . 14 are divided in such cases into two pairs, wherein the MOSFETs 11 . . . 14 of one pair are connected in series and the two pairs are connected in parallel to one another. The stationary-side coil 16 is connected in this case by an output to the center of one of the pairs and by another output to the center of the other pair. A DC input voltage is present at the respectively connected outer sides of the two pairs.

In an alternate embodiment which is not shown in FIG. 1, only two MOSFETs 11 . . . 14 are used. In this case the two MOSFETs 13, 14 of one of the two bridge halves, for example the right bridge half, are replaced by capacitors, which form an auxiliary intermediate circuit.

Figure 2:
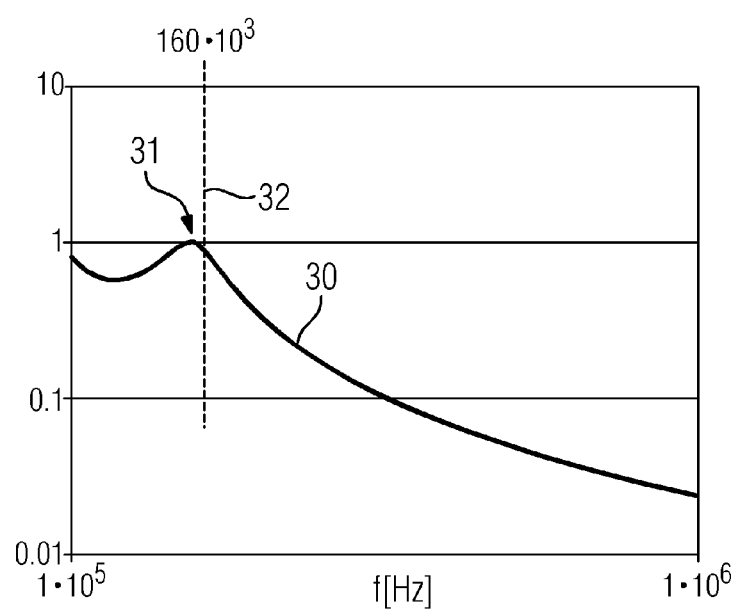

The overall structure of the stationary charging circuit 10 has a frequency curve 30, which is depicted in FIG. 2. The frequency scale in FIG. 2 extends in this case from 100 kHz to 1 MHz. The frequency curve 30 has a clear maximum at a frequency of 156 KHz in this example. This maximum is referred to as the resonance frequency.

A control device for the stationary charging circuit 10 not shown in FIG. 1 now controls the MOSFETs 11 . . . 14 in charging mode so that a slightly over resonant operation is carried out. In this case the MOSFETs 11 . . . 14 actively switch off a current differing from zero. In the present exemplary embodiment the stationary charging circuit 10 is activated so that a working frequency 32 of 160 kHz, i.e. 4 kHz more than the resonance frequency, is produced.

FIG. 3 shows an actual switching process. FIG. 3 shows the curve of the drain current 41 and also the curve of the drain-source voltage 40 of a MOSFET. The x-axis of the graph of FIG. 3 in this case shows a full period duration corresponding to the working frequency 32. It can be seen that the switching off of the corresponding MOSFET 11 . . . 14 occurs at slightly under 50% of the period duration at a drain-current 41 differing greatly from zero. For this each of the MOSFETs 11 . . . 14 switches off a drain current 41 of appr. 5 A. The switching on of the respective MOSFETs 11 . . . 14 naturally occurs such that the function of an inverter is produced and occurs at zero voltage after a dead time of appr. 100 to 200 ns has elapsed. The current to be switched off commutes into the still available capacitors and body diodes of MOSFETs 11 . . . 14 and automatically flows after exceeding 0 A, for example in FIG. 3 at appr. 5% of the period duration, through the switched on MOSFETs 11 . . . 14.

The slightly over resonant operation is also maintained in this case if the resonant frequency changes because of a changed positioning of the stationary-side coil 16 in relation to the vehicle-side coil 21. In other words a wideband adaptation of the working frequency 32 to the respective relative positioning is realized. Advantageously these results in the zero crossing of the drain current 41 no longer have to be detected exactly, since the switching on and switching off no longer take place at the zero crossing in any event. The capacitors 15 are charged by the respective residual current and thus contribute to the avoidance of the switching losses.

The fact that MOSFETs 11 . . . 14 are used instead of IGBTs for example in the stationary charging circuit 10 means that, as well as the option of higher switching frequencies of at least 100 kHz, large dead times are also not necessary for charge carrier recombination. The stationary charging circuit 10 allows larger air gap differences and lateral displacement of the vehicle-side coil 21 in relation to the stationary-side coil 16 to be compensated for.

The invention claimed is:

1. A transformer sub-circuit for charging an electrically operated vehicle, the transformer sub-circuit comprising:
    a stationary-side bridge circuit having a least two semiconductor switches being MOSFETs;
    a stationary-side inductance connected to said bridge circuit and configured to be used as a primary side of a transformer; and
    a controller for said semiconductor switches of said bridge circuit, said controller configured to operate said bridge circuit as an inverter and to carry out switching off of one of said semiconductor switches when a current flow through said one semiconductor switch reaches a definable threshold value differing from zero.

2. The transformer sub-circuit according to claim 1, wherein said controller is configured to use a switching frequency which is higher than a resonance frequency.

3. The transformer sub-circuit according to claim 1, which further comprises means for determining a variable representing a measure of a current in the sub-circuit in conjunction with said inductance.

4. The transformer sub-circuit according to claim 1, wherein said switching off takes place at a current flow of between 2 A and 10 A.

5. The transformer sub-circuit according to claim 1, wherein said controller is configured, after one of said semiconductor switches is switched off, to switch on at least one other of said semiconductor switches after a period has elapsed.

6. The transformer sub-circuit according to claim 5, wherein said period is between 100 ns and 200 ns.

7. The transformer sub-circuit according to claim 1, wherein said controller is configured to switch said semiconductor switches with a frequency of more than 100 kHz.

* * * * *